United States Patent [19]

Cullen et al.

[11] Patent Number: 4,619,673
[45] Date of Patent: Oct. 28, 1986

[54] ADSORBENT DEVICE

[75] Inventors: John S. Cullen, Buffalo; Samuel A. Incorvia; James A. Vogt, both of Tonawanda, all of N.Y.

[73] Assignee: Multiform Desiccants, Inc., Buffalo, N.Y.

[21] Appl. No.: 734,171

[22] Filed: May 15, 1985

[51] Int. Cl.[4] .......... B01D 53/04; F23B 43/00
[52] U.S. Cl. .......... 55/387; 55/493; 55/503; 55/508; 62/480; 62/503
[58] Field of Search ............ 55/316, 387, 493, 503, 55/508; 62/474, 476, 480, 503; 210/232, 282, 287, 484, DIG. 6, DIG. 7

[56] References Cited

U.S. PATENT DOCUMENTS

| 2,364,573 | 12/1944 | Vokes | 55/503 X |
|---|---|---|---|
| 2,781,103 | 2/1957 | Daiger et al. | 55/508 X |
| 3,047,994 | 8/1962 | LeBrun | 55/493 |
| 3,420,071 | 1/1969 | Bottum | 62/503 |
| 3,734,296 | 5/1973 | Proctor et al. | 210/288 |
| 4,072,615 | 2/1978 | McConnell | 55/387 X |
| 4,109,487 | 8/1978 | Carr | 62/474 |
| 4,111,005 | 9/1978 | Livesay | 62/503 |
| 4,116,649 | 9/1978 | Cullen et al. | 55/387 |
| 4,187,695 | 2/1980 | Schumacher | 62/503 |
| 4,199,960 | 4/1980 | Adams | 62/503 |
| 4,220,553 | 9/1980 | Krause | 55/387 X |
| 4,270,934 | 6/1981 | Widdowson et al. | 55/316 |
| 4,276,756 | 7/1981 | Livesay | 62/503 |
| 4,291,548 | 9/1981 | Livesay | 62/503 |
| 4,401,447 | 8/1983 | Huber | 55/387 |
| 4,405,347 | 9/1983 | Cullen et al. | 55/387 |
| 4,457,843 | 7/1984 | Cullen et al. | 210/282 |
| 4,464,261 | 7/1984 | Cullen et al. | 210/282 |
| 4,474,035 | 10/1984 | Amin et al. | 55/387 X |
| 4,496,378 | 1/1985 | Kish | 55/316 |
| 4,509,340 | 4/1985 | Mullally et al. | 62/503 |
| 4,519,823 | 5/1985 | Kinney, Jr. et al. | 55/493 |

Primary Examiner—Robert Spitzer
Attorney, Agent, or Firm—Joseph P. Gastel

[57] ABSTRACT

An adsorbent device including a porous casing containing adsorbent for placement between spaced pipe portions in a refrigerant receiver with the outer edge portions of the casing bearing against the spaced pipe portions, the adsorbent device including a clip having tabs at opposite ends thereof bonded to tabs on opposite sides of the casing, clip portions on the ends of the clip including a first U-shaped portion extending substantially in the direction of the body of the clip for loosely bracketing one of the pipe portions, and a second U-shaped portion extending substantially perpendicularly to the body of the clip for snapping onto the other pipe portion to thereby hold the casing of the adsorbent device between the spaced pipe portions. The clip is oriented relative to the casing so that the clip portion which snaps onto the pipe always extends substantially perpendicularly thereto, regardless of which pipe portion it snaps onto when the pipe portions are not parallel to each other.

27 Claims, 14 Drawing Figures

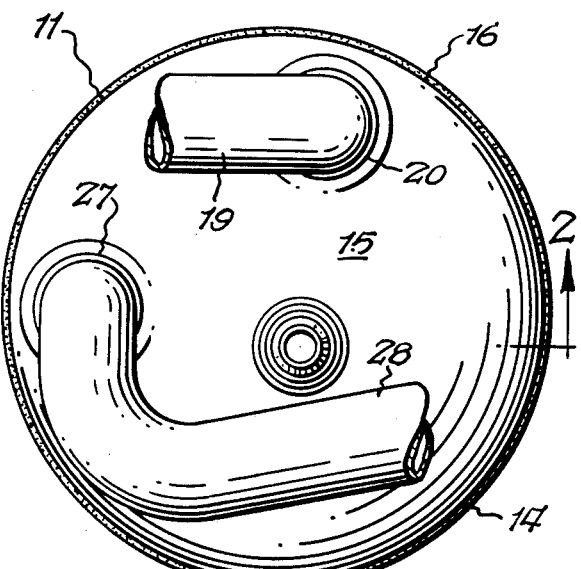
Fig. 1.
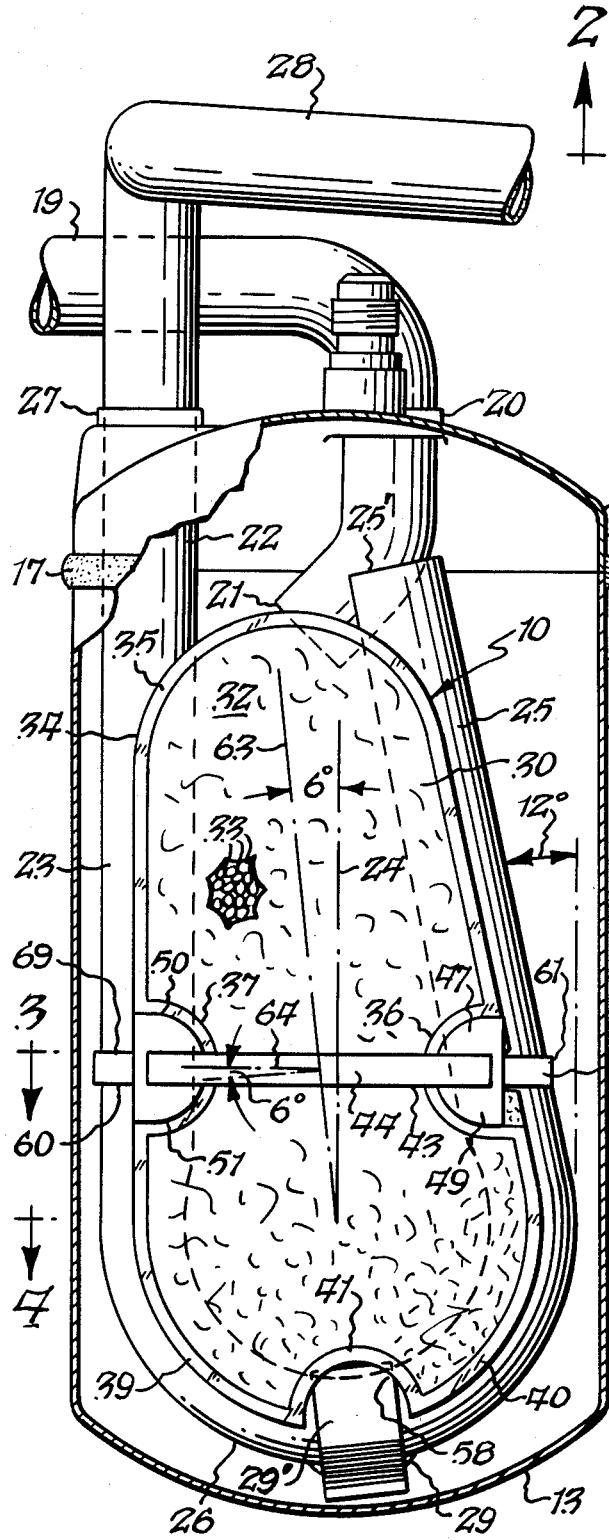
Fig. 2.
Fig. 5.

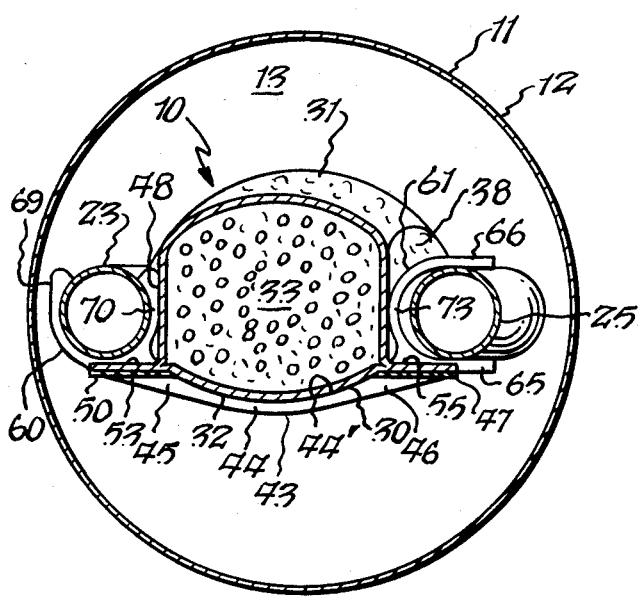
Fig. 3.
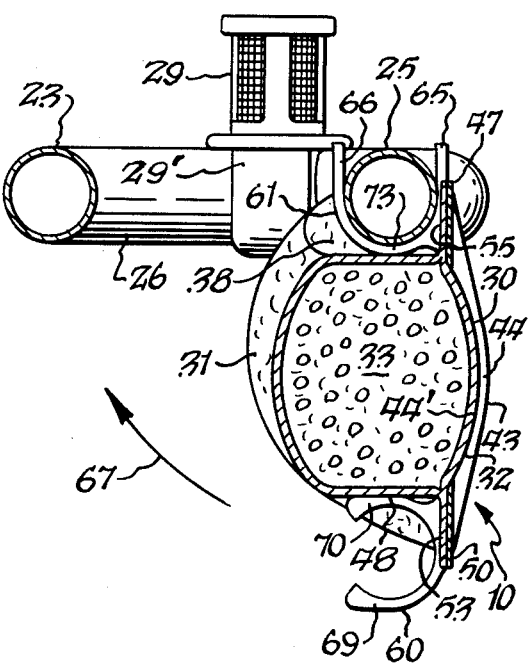
Fig. 6.
Fig. 4.
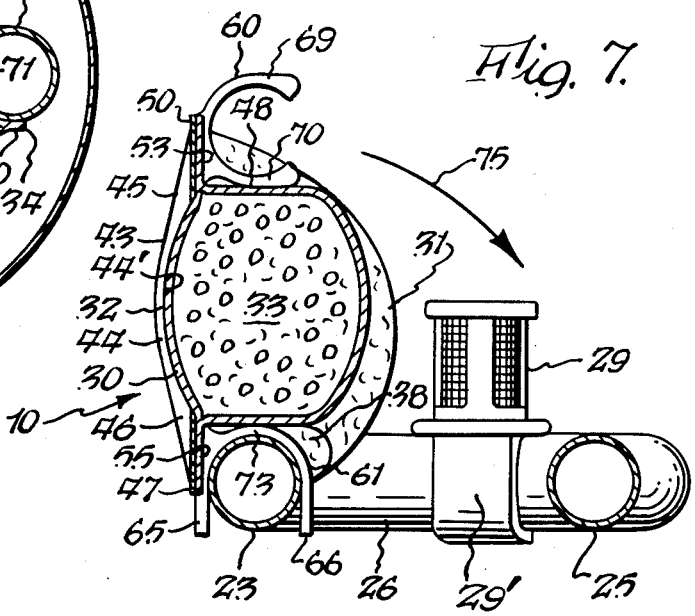
Fig. 7.

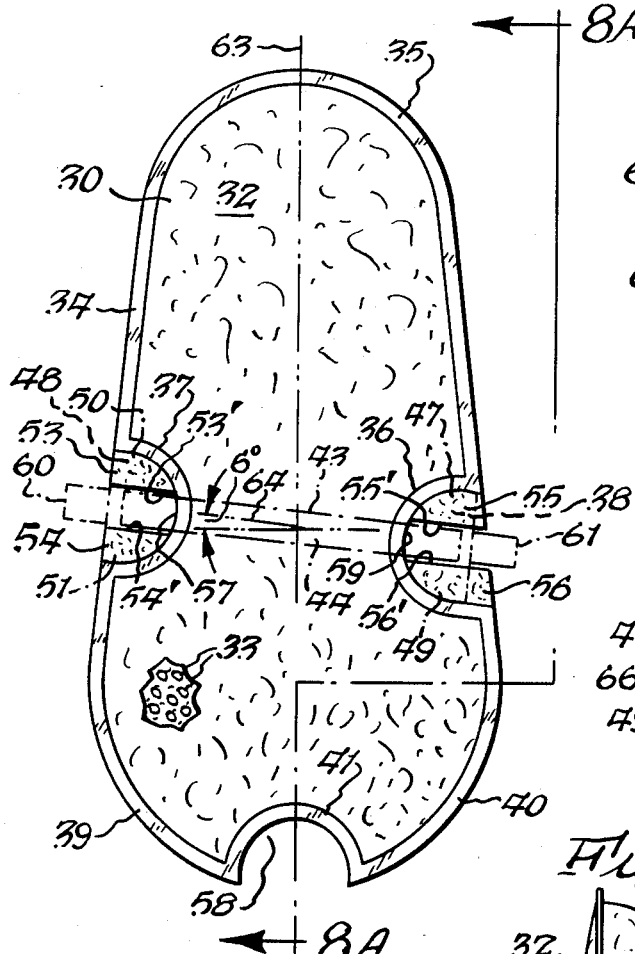
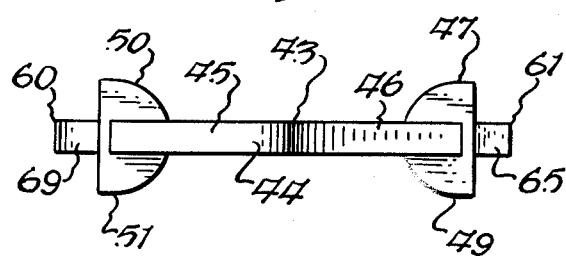
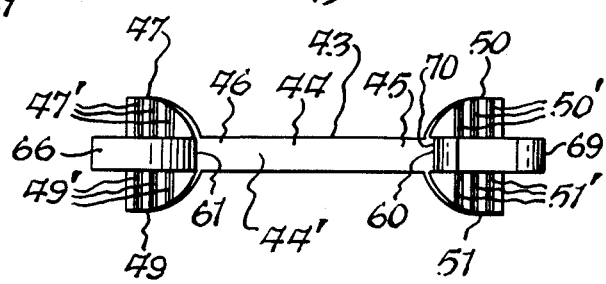
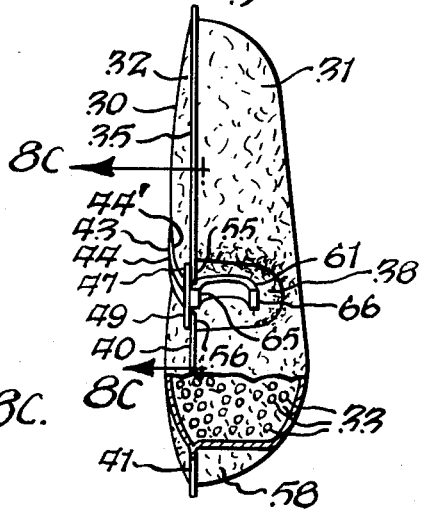
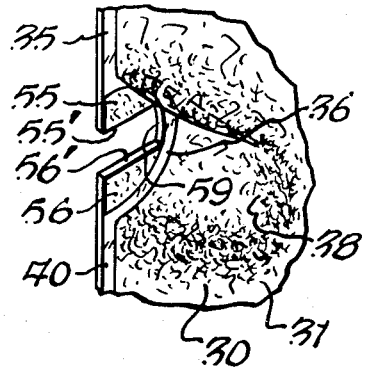
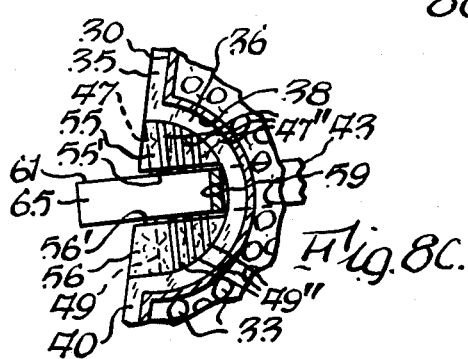
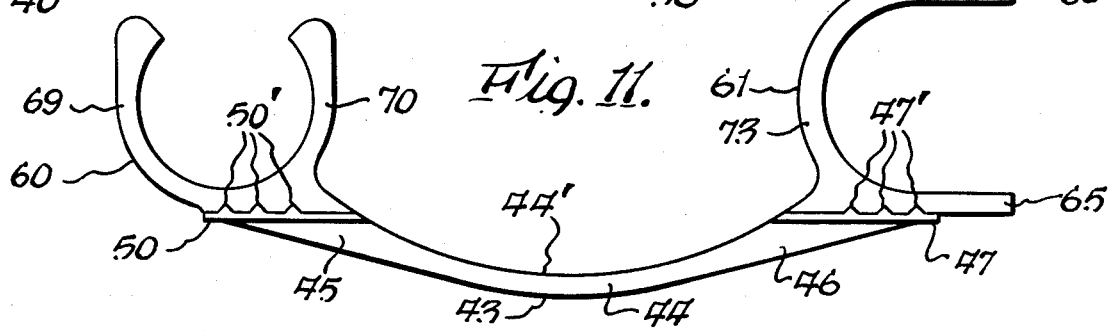

ADSORBENT DEVICE

BACKGROUND OF THE INVENTION

The present invention relates to an improved adsorbent device adapted to be mounted in the receiver of an automotive air conditioning system.

By way of background, it is common practice to place an adsorbent device in the receiver of an automotive air conditioning system to adsorb undesirable substances from the refrigerant. In the past there were numerous ways of fixing the adsorbent device in position, such as by means of flaps and harnesses, which were secured to a pipe in the refrigerant receiver. Usually the flaps or harnesses had to be attached to the refrigerant pipes by threading the pipe through an aperture in a flap attached to the casing of the adsorbent device, thereby requiring extra labor. Devices of this type are shown in U.S. Pat. Nos. 4,187,695, 4,199,960 and 4,116,649. In U.S. Pat. No. 4,464,261 an adsorbent device is strapped to the filter associated with a refrigerant receiver. In U.S. Pat. No. 4,457,843 an adsorbent device is wedged between the pipes of a refrigerant receiver.

SUMMARY OF THE INVENTION

It is one object of the present invention to provide an improved adsorbent device which has a mounting clip uniquely formed as an integral part thereof, with the clip being used to firmly attach the adsorbent device between pipes in a refrigerant receiver.

Another object of the present invention is to provide an improved adsorbent device for a refrigerant receiver which is maintained in position between pipes which extend at an angle to each other, and which can be installed from either side of the pipes in a satisfactory manner.

A further object of the present invention is to provide an improved adsorbent device which can be snapped into position with very little labor and which, because of the geometry of the device, cannot be installed backward or improperly. Other objects and attendant advantages of the present invention will readily be perceived hereafter.

The present invention relates to an adsorbent device for mounting in a refrigerant receiver having a receiver axis and a pipe therein having first and second spaced pipe portions and a return bend connecting said first and second spaced pipe portions, said adsorbent device comprising a casing including first and second walls, adsorbent, means securing said first and second walls to each other to confine said adsorbent therebetween, spaced wall portions on said first wall in contiguous relationship with said first and second pipe portions, a first casing end portion on said casing proximate said return bend and a second casing end portion on said casing remote from said return bend, clip means, a central clip portion on said clip means extending across said second wall in a direction transverse to said receiver axis and between said first and second casing end portions, and clip end portions on opposite ends of said central portion of said clip means for securing said clip means to said first and second pipe portions.

The various aspects of the present invention will be more fully understood when the following portions of the specification are read in conjunction with the accompanying drawings wherein:

BRIEF DESCRIPTION OF THE DRAWINGS

FIG. 1 is a fragmentary plan view of the top of a refrigerant receiver of an automotive air conditioning system;

FIG. 2 is a fragmentary cross sectional view, partially broken away, taken substantially along line 2—2 of FIG. 1;

FIG. 3 is a cross sectional view taken substantially along line 3—3 of FIG. 2 and showing both the attachment and orientation between the adsorbent device and the pipes within the receiver;

FIG. 4 is a cross sectional view taken substantially along line 4—4 of FIG. 2;

FIG. 5 is a partial view similar to FIG. 2 but showing the pipes within the refrigerant receiver reversed 180° relative to the position shown in FIG. 2 and showing the adsorbent device mounted the pipes in this orientation;

FIG. 6 is a view similar to FIG. 3 but showing the manner in which the adsorbent device is installed on the pipes from one side of the pipes to cause it to be mounted as shown in FIGS. 2, 3 and 4;

FIG. 7 is a view similar to FIG. 6 but showing how the adsorbent device is installed on the pipes from the opposite side of the pipes shown in FIG. 6 to cause it to be mounted as shown in FIG. 5;

FIG. 8 is a rear elevational view of the adsorbent device;

FIG. 8A is a view, partially in cross section, taken substantially along line 8A—8A of FIG. 8;

FIG. 8B is a fragmentary perspective view of the casing of the adsorbent device showing the contour of one of the recesses which receives the end of the clip;

FIG. 8C is a fragmentary cross sectional view taken substantially along line 8C—8C of FIG. 8A;

FIG. 9 is an elevational view of one side of the clip which is bonded to the adsorbent casing;

FIG. 10 is an elevational view of the opposite side of the clip which is bonded to the adsorbent casing; and FIG. 11 is an enlarged plan view of the clip which is bonded to the adsorbent casing.

DESCRIPTION OF THE PREFERRED EMBODIMENTS

The improved adsorbent device 10 is shown in FIGS. 2 and 5 in its installed condition within the refrigerant receiver or accumulator 11 of an automotive air conditioning system. As is well understood, but not shown in the drawings, the air conditioning system includes a compressor, the output of which is conducted to a condenser and then to an expansion valve and then to an evaporator and then to receiver 11 and then back to the compressor. An air conditioning system of this type is shown in U.S. Pat. No. 4,291,548 which is incorporated herein by reference.

Accumulator or receiver 11 includes a cup-shaped lower member having a cylindrical wall 12 and a bottom wall 13. It also includes an upper inverted dished member 14 which has a top wall 15 and a cylindrical side wall 16 which is welded to wall 12 at seam 17. Pipe 19 is mounted in sealed relationship with top wall 14 at 20 and conducts a mixture of liquid and gaseous refrigerant to receiver 11 from the evaporator. The refrigerant enters receiver 11 from the lowermost portion 21 of pipe 19 and spills onto adsorbent device 10. Mounted within receiver 11 is a generally U-shaped pipe 22 having a pipe portion 23 which extends substantially parallel to the longitudinal axis 24 of the receiver and a pipe portion 25 which extends at an angle to the longitudinal axis 24. In this instance the angle is 12°, as shown, but it may be of any value. A return bend 26 connects pipe portions 23 and 25. The upper part of pipe portion 23 is mounted in sealed relationship with top 14 at 27. End portion 28, which is an extension of pipe portion 23, leads to the air conditioning compressor. The top 25' of pipe portion 25 is open to receive gaseous refrigerant. The return bend 26 includes an aperture (not shown) for receiving a conduit (not shown) leading from filter 29. In this respect, it is conventional in the art to have a filter, such as 29, mounted in the disclosed location to filter liquid, such as oil, entering return bend 26. Insofar as pertinent here, filter 29 is suitably attached to return bend 26 in any suitable manner, such as by a plastic strap 29'. A filter, which is similar to filter 29, is shown in U.S. Pat. No. 4,464,261 which is incorporated herein by reference. However, since the filter 29 and its mode of attachment form no part of the present invention, it is deemed that further description thereof is unnecessary.

The improved adsorbent device 10 is mounted in contiguous relation to and spans pipe portions 23 and 25. Adsorbent device 10 includes a casing 30 which has a porous rounded wall 31 and a slightly rounded porous wall 32. Walls 31 and 32 confine a suitable granular adsorbent 33 therebetween, and the outer edges of walls 31 and 32 are sealed to each other by a continous seam 34 which is formed by fusing the outer edge portions of walls 31 and 32 to each other. Seam 34 includes an upper portion 35 which is continous and terminates at curved seam portions 36 and 37. Seam 34 also includes portions 39 and 40 which extend between curved seam portions 36 and 37 and curved seam portion 41. The curved seam portions 36, 37 and 41 are at the ends of substantially identical concave recesses or indentations 48, 38 and 58, respectively, formed in the wall 31 of adsorbent device 10. The shape of recesses 38, 48 and 58 can best be visualized from FIG. 8B. The recesses or indentations 48, 38 and 58 are formed by pressing wall 31 under suitable heat and pressure before joining its edges to wall 32. The junctions between the curved wall 31 and the straight portions of upper seam portion 35 and the junction of curved wall 31 and seams 39 and 40 lie on the centerline of pipe 22 when device 10 is in its installed position.

The walls 31 and 32 are preferably fabricated from a thermoplastic sheet material, such as felted polyester, and the seam 34 is preferably fused, but the edges of walls 31 and 32 may be joined in any suitable manner, such as by any type of fusion, gluing, or stitching. By way of example and not of limitation, a felted polyester which has been used is between 0.065 and 0.097 inches thick and has a weight of about 9 ounces per square yard. It will be appreciated that other polyesters of different thickness and other types of construction, such as spun-bonded, may be used. It will also be appreciated that casing 30 may be made of any other suitable material which is porous including plastic or natural fibers. The adsorbent 33 in adsorbent device 10 is molecular sieve, but it may selectively be, without limitation, adsorbents such as silica gel, metal alumino silicate, alumina, calcium sulfate, activated charcoal, or any other desired compound in bead, pellet or granular form, depending on the circumstances of its use.

The improved adsorbent device 10 of the present invention includes a clip 43 which is secured to casing 30. Clip 43 includes a central body portion 44 having end portions 45 and 46 at opposite ends of the central portion. Central body portion 44 includes a concave surface 44' which is placed in contiguous abutting relationship with casing wall 32. Tabs 47 and 49 are formed integrally with and extend from opposite sides of end portion 46. Tabs 50 and 51 are formed integrally with and extend from opposite sides of end portion 45. Vertical ridges 47', 49', 50' and 51' are formed integrally with tabs 47, 49, 50 and 51, respectively, as shown. Tabs 53, 54, 55 and 56 (FIG. 8) are formed as extensions of casing wall 32 and extend beyond concave seams 36 and 37. Tabs 53 and 54 terminate at edges 53' and 54' to define a slot 57 therebetween. Tabs 55 and 56 terminate at edges 55' and 56' to define a slot 59 therebetween. When clip 43 is mounted on casing 30 with surface 44' of the clip in contiguous abutting relationship to wall 32, clip tabs 50, 51, 47 and 49 will be located in contiguous abutting relationship with casing tabs 53, 54, 55 and 56, respectively. U-shaped clip portions 60 and 61 of clip 43 will extend through slots 57 and 59, respectively. Casing tabs 53, 54, 55 and 56 are bonded to clip tabs 50, 51, 47 and 49, respectively, by any suitable means, such as fusion, ultrasonic welding, gluing or any other suitable form of attachment to thus form casing 30 and clip 43 into a one-piece unit. The ridges 47', 49', 50' and 51' provide suitable pressure points to insure good bonding when the bonding is by suitable fusion. The bonding between ridges 47' and 49' occurs at lines 47'' and 49'', respectively, (FIG. 8C) and similar bonding occurs at corresponding lines (not shown) where ridges 50' and 51' engage tabs 50 and 51, respectively. Clip 43 is an integral molded member fabricated from suitable polyethylene or polypropylene.

Casing 30 has a centerline 63 and casing 30 is generally symmetrical about centerline 63 except that the recess 48 (FIGS. 3 and 6) which is outlined by seam portion 37 and wall 31 is at a higher elevation than the recess 38 which is outlined by seam portion 36 and wall 31. Also see FIGS. 8 and 8A. The axis 64 (FIG. 2) of central clip portion 44 is inclined 6° (FIG. 8) to the horizontal, as shown, when longitudinal axis 63 is vertical. When casing 30 is in the installed position of FIG. 2, its longitudinal axis 63 will bisect the angle formed by pipe portions 23 and 25, and thus axis 63 of the casing will be inclined at 6° to the vertical axis 24 of receiver 11. Therefore in its installed position, clip portion 60 will extend perpendicularly to pipe portion 23 because the 6° counterclockwise tilt of casing axis 63 relative to receiver axis 24 will be cancelled by the 6° clockwise tilt of clip central portion 44 relative to the horizontal axis of FIG. 8. The orientation of clip portion 60 perfectly perpendicularly to pipe portion 23 is of importance in order to obtain a good tight connection therebetween without placing any stress on the casing 30.

In order to install adsorbent device 10 into its final position shown in FIG. 2, the following manipulations are performed. First, the legs 65 and 66 of U-shaped portion 61, which extend generally in the direction of central portion 44, are placed around pipe portion 25, as shown in FIG. 6, with the seam 41 at the bottom of casing 30 at approximately the elevation where it will be in line with the top of filter 29, as shown in FIG. 2. Thereafter, the adsorbent device 10 is swung in the direction of arrow 67 until such time as the legs 69 and 70 of U-shaped clip 60, which extend generally perpendicularly to central portion 44, snap around pipe portion 23. The dimensioning is such that the space between legs 69 and 70 is slightly less than the diameter of pipe portion 23 so that a good tight fit will be obtained due to the inherent resilience of the clip portion 60. However, the space between legs 65 and 66 of U-shaped clip portion 61 is substantially equal to the diameter of pipe portion 25 so that it can reach its own level when clip portion 60 is snapped into position. By way of example and not of limitation, pipe portions 23 and 25 have an outer diameter of 0.625 inches. Legs 69 and 70 are on a diameter of 0.562 inches when the diameter is drawn substantially perpendicularly thereto, and the space between substantially parallel leg portions 65 and 66 is 0.625 inches.

When the adsorbent device 10 is in its installed position, the outer portions 71 and 72 (FIG. 4) of wall 31 will lie in contiguous abutting relationship with pipe portions 25 and 23, respectively, to thereby limit the amount the casing 30 can be inserted between the pipe portions 23 and 25, and the central portion of wall 31 between portions 71 and 72 will protrude into the space between the pipe portions 23 and 25. Furthermore, the bottom end of the casing 30 will be in substantially complementary mating relationship with the return bend 26. By virtue of the foregoing fit, adsorbent device 10 is held in firm locked engagement with pipe portions 23, 25 and 26. Furthermore, the depth of U-shaped portion 61 is such that the end wall 73 will always be slightly spaced (FIG. 3) from pipe portion 25 to therefore accommodate variations in angularity of pipe portion 25 relative to pipe portion 23.

The foregoing description was based on installing adsorbent device 10 in the manner described above relative to FIGS. 3 and 6 where clip portion 60 snapped onto pipe portion 23. However, the geometry of the adsorbent device 10 is such that it can also be installed satisfactorily as shown in FIGS. 5 and 7 with the clip portions 60 and 61 reversed on the pipe portions 23 and 25. Therefore, the installation procedure is foolproof because the device 10 cannot be installed backwards. In this respect, if the installer should cause the legs 65 and 66 to bracket pipe portion 23 (FIG. 7) rather than pipe portion 25 (FIG. 6), adsorbent device 10 can be installed by merely pivoting clip portion 60 in the direction of arrow 75 toward pipe portion 25 and causing the legs 69 and 70 of clip portion 60 to snap onto pipe portion 25 (FIG. 5) rather than onto pipe portion 23 (FIG. 2). In the installed position shown in FIG. 5, the clip 43 and clip portion 60 will be oriented perpendicularly to pipe portion 25 because of the geometry of the adsorbent device 10. In this respect, as noted above, pipe portion 25 extends at an angle of 12° to the vertical whereas pipe portion 23 extends at 0° to the vertical. In its installed condition, the longitudinal axis 63 of casing 30 is inclined 6° clockwise to the vertical because it essentially bisects the 12° angle between pipe portions 23 and 25. However, as noted above, the axis 64 of clip 43 is inclined 6° clockwise to the horizontal (FIG. 8). Therefore, the two 6° inclinations are additive to cause the clip 43 to be inclined 12° to the horizontal to thereby cause it to extend perpendicularly to pipe portion 25. As noted above, the fact that clip portion 60 extends perpendicularly to pipe portion 26 causes it to be locked firmly thereto. The adsorbent device 10 will therefore be locked between pipe portions 23, 25 and 26 in an extremely firm manner without the clip 43 applying a stress to casing 30. In the installation of FIG. 5, filter 29 is located in recess 58. In each type of installation, namely, that of FIG. 6 and that of FIG. 7, the more curved side wall 31 protrudes into the space between pipe portions 23 and 25, as can be visualized from a comparison of FIGS. 6 and 7.

While the above description has been directed to a receiver wherein the pipe portions are not parallel, it will be appreciated that the present invention can be modified for use in a receiver wherein the pipes are parallel by making the casing symmetrical about its longitudinal axis and mounting the clip perpendicularly thereto. This modification is intended to be covered by the claims.

While preferred embodiments of the present invention have been disclosed, it will be appreciated that it is not limited thereto, but may be otherwise embodied with the scope of the following claims.

What is claimed is:

1. In a refrigerant receiver having a receiver axis and a pipe therein having first and second spaced pipe portions and a return bend connecting said first and second spaced pipe portions, an adsorbent device comprising a casing including first and second walls, adsorbent, means securing said first and second walls to each other to confine said adsorbent therebetween, spaced wall portions on said first wall in contiguous relationship with said first and second pipe portions, a first casing end portion on said casing proximate said return bend and a second casing end portion on said casing remote from said return bend, clip means operatively associated with said casing for securing said casing relative to said pipe portions, a central clip portion on said clip means extending across said second wall in a direction transverse to said receiver axis and between said first and second casing end portions, and clip end portions on opposite ends of said central portion of said clip means for securing said clip means to said first and second pipe portions.

2. In a refrigerant receiver as set forth in claim 1 wherein said clip means press said spaced wall portions against said first and second spaced pipe portions.

3. In a refrigerant receiver as set forth in claim 2 including a second wall portion on said first wall between said first wall portions and positioned between said first and second pipe portions and protruding into the space between said first and second pipe portions a greater amount than said first wall portions.

4. In a refrigerant receiver as set forth in claim 1 including means for bonding said clip means to said casing.

5. In a refrigerant receiver as set forth in claim 4 wherein said means for bonding said clip means to said casing comprise tab means extending outwardly beyond one of said first and second walls.

6. In a refrigerant receiver as set forth in claim 5 including recesses on said casing proximate said clip end portions, said tab means extending into at least one of said recesses.

7. In a refrigerant receiver as set forth in claim 6 including second tab means on said clip means bonded to said tab means.

8. In a refrigerant receiver as set forth in claim 1 including recesses in said casing proximate said clip end portions.

9. In a refrigerant receiver as set forth in claim 1 wherein said clip end portions include a first clip portion extending in generally the same direction as said central portion for bearing on one of said first and second pipe portions, and a second clip portion of U-shape having legs which extend in a direction transverse to said central portion for snapping onto the other of said first and second pipe portions.

10. In a refrigerant receiver as set forth in claim 9 wherein said first clip portion is of U-shape with legs extending substantially in the direction of said central portion for bracketing said one of said first and second pipe portions.

11. In a refrigerant receiver as set forth in claim 1 wherein said first pipe portion is substantially parallel to said receiver axis and wherein said second pipe portion extends at a predetermined angle to said receiver axis, said casing having a longitudinal axis which substantially bisects the angle between said first and second pipe portions, and said central clip portion orienting at least one of said clip end portions at approximately one-half of said predetermined angle to said longitudinal axis to cause said one of said clip end portions to always be oriented substantially perpendicularly to said first or second pipe portion on which it is mounted.

12. In a refrigerant receiver as set forth in claim 11 including means for bonding said clip means to said casing to maintain said one of said clip end portions permanently affixed in said orientation of one-half of said predetermined angle to said longitudinal axis.

13. In a refrigerant receiver as set forth in claim 12 wherein said means for bonding said clip means to said casing comprise tab means extending outwardly beyond one of said first and second walls.

14. In a refrigerant receiver as set forth in claim 13 including recesses on said casing proximate said clip end portions, said tab means extending into at least one of said recesses.

15. In a refrigerant receiver as set forth in claim 14 including second tab means on said clip means bonded to said tab means.

16. In a refrigerant receiver as set forth in claim 11 wherein said clip end portions include a first clip portion extending in generally the same direction as said central portion for bearing on one of said first and second pipe portions, and a second clip portion of U-shape having legs which extend in a direction transverse to said central portion for snapping onto the other of said first and second pipe portions.

17. In a refrigerant receiver as set forth in claim 16 wherein said first clip portion is of U-shape with legs extending substantially in the direction of said central portion for bracketing said one of said first and second pipe portions.

18. An adsorbent device comprising an elongated casing having a longitudinal axis and first and second walls, adsorbent, means securing said first and second walls to each other with said adsorbent therebetween, first and second casing end portions on said casing, clip means operatively associated with said casing for securing said casing to a foreign object, a central clip portion on said clip means, said central clip portion extending aross said casing transversely to said longitudinal axis and between said first and second casing end portions, and clip end portions on opposite ends of said central clip portion for securing said clip means to said foreign object.

19. An adsorbent device as set forth in claim 18 including means for bonding said clip means to said casing.

20. An adsorbent device as set forth in claim 19 wherein said means for bonding said clip means to said casing comprise tab means extending outwardly beyond one of said first and second walls.

21. An adsorbent device as set forth in claim 20 including recesses on said casing proximate said clip end portions, said tab means extending into at least one of said recesses.

22. An adsorbent device as set forth in claim 21 including second tab means on said clip means bonded to said tab means.

23. An adsorbent device as set forth in claim 18 including recesses in said casing proximate said clip end portions.

24. An adsorbent device as set forth in claim 18 wherein said clip end portions include a first clip portion extending in generally the same direction as said central portion for bearing on one of said first and second pipe portions, and a second clip portion of U-shape having legs which extend in a direction transverse to said central portion for snapping onto the other of said first and second pipe portions.

25. An adsorbent device as set forth in claim 24 wherein said first clip portion is of U-shape with legs extending substantially in the direction of said central portion for bracketing said one of said first and second pipe portions.

26. An adsorbent device as set forth in claim 25 including recesses in said casing, and wherein said clip end portions exted into said recesses.

27. An adsorbent device as set forth in claim 18 wherein said central clip portion extends at an angle other than 90° to said longitudinal axis.

* * * * *